United States Patent [19]

Blakeley

[11] 4,350,350
[45] Sep. 21, 1982

[54] SELF-COMPENSATION GASKET FOR GROOVED END PIPE COUPLINGS

[75] Inventor: James Blakeley, Thornhill, Canada

[73] Assignee: International Telephone and Telegraph Corporation, New York, N.Y.

[21] Appl. No.: 143,980

[22] Filed: Apr. 28, 1980

[51] Int. Cl.³ ............... F16L 21/06; F16J 15/06
[52] U.S. Cl. ............... 277/207 A; 285/112
[58] Field of Search ............... 285/112, 110; 277/DIG. 2, 207 A

[56] References Cited

U.S. PATENT DOCUMENTS 3,134,612  5/1964  Glasgow ............... 285/112
3,291,506 12/1966  Blakeley ............... 285/112
3,351,352 11/1967  Blakeley et al. ............... 285/112
3,430,989  3/1969  Wendt ............... 277/207 A Primary Examiner—Robert I. Smith
Attorney, Agent, or Firm—John T. O'Halloran

[57] ABSTRACT

A self-compensation gasket for grooved end pipe couplings for use in sealing the joint between the pipe ends. An "immediate" seal at the pipe end gap serves as a barrier to possible entry of solids into the internal working section of the gasket. Compression pads on the outside diameter of the gasket concentrate the loading of the gasket in a localized manner such that a high compression loading may be insured.

7 Claims, 6 Drawing Figures

SELF-COMPENSATION GASKET FOR GROOVED END PIPE COUPLINGS

BACKGROUND OF THE INVENTION

This invention relates to the coupling of sections of pipe by the use of coupling housings engaging grooves in the pipe and is particularly concerned with improvements in the gaskets employed for sealing the joint between the pipe ends.

In the coupling of sections of pipe employing coupling housings bridging the gap between the pipe ends, which housings engage grooves in the pipe exteriors and contain pressure-responsive gaskets bridging the gap, the pressure of the fluid in the pipe is effective to assist in sealing the joint. In order that it may do so, it is common to employ gaskets of C-shape in cross section and to couple the pipes with the ends thereof spaced a small distance apart providing for flexibility in the joint, thus leaving a path between the interior of the pipes and the interior of the gasket for transmission of the pressure to the gasket. When the "C" shape is in position on the pipe ends, the opening in the "C" sits over the gap between the ends. This allows the internal pressure to enter the gasket cavity and force the gasket lips down onto the pipe surfaces for increased tightness. This cavity feature, while being effective in increased sealing qualities presents a problem in certain piping services. Such services generally involve the conveyance of fluids carrying particulate matter or conveyance of finely granulated solids where the solids tend to fill the gasket cavity, thereby limiting its function to flex. This, in turn reduces the ability of the pipe ends to articulate when temperature changes or other forces are present. Such service requirements for piping joints are found in power piping systems where powdered fossil fuel is pumped through piping into steam generating furnaces. (While operating temperatures in these piping systems are ambient, periodic flashbacks from the furnace cause the temperature inside the piping to increase drastically and, in many instances, beyond the maximum temperature the gasket elastomeric material can withstand.) It is undesirable to allow the product flowing through the pipe to gather in the hollow of the gasket, commonly referred to as the "well".

There are gasket sections offered that have modified "C" sections to eliminate the gasket cavity. These sections are designed to fill the space inside the coupling cavity and, in so doing, become a solid unyielding section without the necessary ability to allow the adjoining pipe ends to flex, at least not without the risk of damaging the elastomeric material of the gasket. Furthermore, such sections have little or no compensating features (because solid elastomerics are practically incompressable) for accommodating reductions in section due to over heating conditions which cause material degradation. One such modified section is covered by U.S. Pat. No. 3,351,352.

BRIEF DESCRIPTION OF THE INVENTION

The meeting of the foregoing needs and the introduction of other advantages into coupling of grooved end pipe by coupling housings clamped thereover are taken care of by the construction of the instant invention. The invention achieves its end while employing standard coupling housings which are readily available and to a certain extent without the necessity of making any changes in standard pipe end preparations.

The modified gasket section that is the subject of this application is designed to overcome the deficiencies of existing sections and include the following features.

1. Provide an "immediate" seal at the pipe end gap which serves as a barrier to possible entry of solids into the internal working section of the gasket, especially fine particulates such as powdered coal. This barrier would provide a constant seal no matter the attitude of the pipe ends, whether fully open or closed, or deflected under varying pressures and wide range of temperatures.

2. Provide the same effective barrier as described in (1) while operating with internal pressure conditions of partial or full vacuum (such conditions exist from time to time in most pressurized piping systems).

3. Further provides to increase the effectiveness of the main seal, that of the "lips", by introducing greater compressive loading at the area of the lips. This is accomplished through the use of compression pads on the outside diameter of the gasket to concentrate the loading of the gasket in a localized manner and not appreciably increase the assembly work loading of the gasket. In this manner a high compressive loading may be insured.

The above is made possible because this new gasket shape has a "compensating well" in the top of its section that allows the built-in full movements of the joint to take place without destroying the integrity of the seal. The action of the section under the various conditions described are illustrated in FIGS. 1 through 6.

The new section offers other indirect advantages in that it makes the installing of the gasket much easier because the section is more flexible. It also allows the replacement of a gasket to be performed without disturbing the pipe—the gasket in strip form can be placed around the pipe ends and joined together with an insert placed in the back "well" that keeps the ends together until the housing is in position—so saving valuable shutdown time.

The gasket improvements of the invention also insure the effecting of tight joints between sections of pipe, since in their positioning of the pipe ends a distance apart they resiliently serve to take up variations from the standard. In other words, they compensate for deviations from squareness of pipe ends and, in the axial dimension variations in the distance between the pipe end and groove.

OBJECT OF THE INVENTION

It is, accordingly, an object of the invention to improve on the gaskets embodied in the coupling of groove end pipe by means of clamping type coupling housings.

Another object is to prevent materials flowing through the pipe from getting into the cavity of the gaskets.

Yet another object is to provide for the compressing or deforming of a novel resilient element sealing between the pipe ends while drawing such pipe ends toward each other by the tightening of the coupling housing about the pipe.

A further object is to form a seal in an improved manner between the ends of the sections of lined pipe coupled together which is not rendered ineffective by substantial temperature and pressure variations within the pipes.

Still further objects are to accomplish the foregoing without any change in existing coupling housings with the exception of the inclusion of the novel gaskets of the invention.

Further and more detailed objects of the invention will in part be obvious and in part be pointed out in the description of the invention taken in conjunction with the accompanying drawings.

An embodiment in accordance with the presently preferred concept of the invention which is illustrated in FIGS. 1 through 6. This particular embodiment is equally applicable to thin wall pipe or tubing whether unlined or provided with a thin lining or with pipe of normal wall thickness.

DESCRIPTION OF THE PREFERRED EMBODIMENTS

Figure 1:
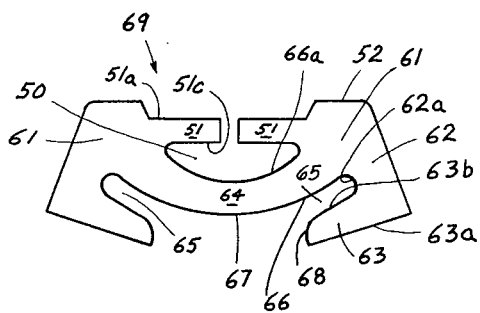
FIG. 1 is a transverse section of a preferred form of gasket with compensating well.

The gasket of FIG. 1, generally indicated at 69, has base portions 61, side portions 62 and lip portions 63. Gasket 69 is provided with a central integral tongue 64 having a substantial degree of flexibility which extends downwardly from the base portion 61 into the gasket cavity dividing that cavity into two cavity portions 65. The tongue 64 is, of course, annular the same as the gasket and is centered with regard to the center line of the gasket. Preferably the tongue 64 is radially outwardly inclining along its bottom face 66 and in relaxed state its middle portion 67 lies radially outwardly with respect to the ends 68 of the lips 63.

The tongue 64 in the gasket of FIG. 1 is wider than the largest possible pipe separation. Furthermore, the bottom face 66 on the tongue 64 converges in a radially inward direction at a gradually increasing rate as does the tongue's top face 66a.

Figure 2:
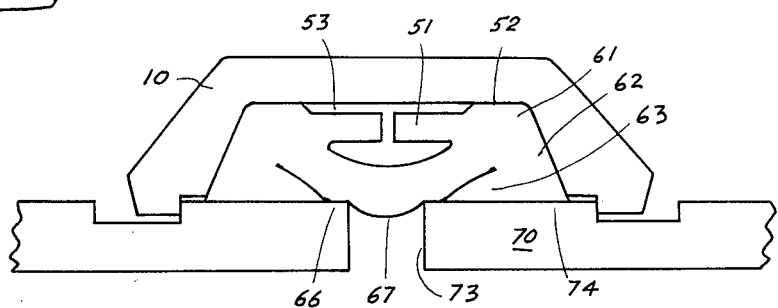
FIG. 2 is a fragmentary section of a pipe joint in accordance with the invention showing, respectively, the gasket of FIG. 1 in place within the coupling housing with the pipe gap full open.

The manner in which the gasket of FIG. 1 accommodates itself to close and seal the joint between the pipe ends is illustrated in FIG. 2. Here two sections of thin walled pipe or tubing 70, which are shown unlined but may be lined with a thin liner as desired, are coupled together by means of a coupling housing 10, in all respects similar to the coupling housing shown and described in Blakeley U.S. Pat. No. 3,291,506. Thus the key sections of the housing are seated within grooves rolled in the exterior of the pipes at the standard distance from the pipe end 73 and, accordingly, providing the standard surfaces 74 for engagement by the gasket. Once the gasket 69 is seated on the surface 74 adjacent the pipe ends its lips 63 will be swung toward each other about the side portions 62 to cause the lips' bottom faces 63a to lie flat on the surface 74. In this instance the tongue 64 will have been sightly projected between the pipe ends 73. The tongue 64 effects a seal against fluid getting up within cavity portions 65.

Furthermore, the cavity portions 65 defined by the tongue's bottom face 66, the top faces of the lips 63b and the side portions inside faces 62a are almost entirely closed when the seal is in the place thus reducing the likelihood that solid particles will enter the cavity portions and settle therein hence reducing the flexibility of the seal. Maintenance of flexibility of the seal is necessary to avoid seal damage in case the pipe joint is exposed to bending forces. The closing of the cavity portions 65 does not reduce the effectiveness of the seal since high fluid pressure against the surface 66 will be directed through the tongue 64 to the lip portions 63. In the event of still higher pressure the tongue will be lifted from its contact with the pipe surfaces 74 and then fluid will be admitted into cavities 65 where it will directly press against the lips' top faces 63b holding the lips firmly in contact with the pipe surfaces 74. A compensating well 50 is provided to permit flexing of the seal 69 while also allowing the tongue to be displaced upon exposure to an extremely high pressure. Partially spanning the compensating well 50 are two resilient arms 51 extending laterally from the base portions 61. Each arm has a top face 51a, an end face 51b and a bottom face 51c. Compression pads 52 are provided at the upper portion of the base portions 61 and lie roughly in line with the side portions 62. Upon insertion of the seal into the coupling housing 10, the compression pads 52 are deformed creating a high compressive force within the base portions 61, side portions 62 and lip portions 63 which compressive force causes the lips' bottom faces 63a to form a fluid tight seal with the pipe surface 74. Additionally, compressive force is transmitted through the base portions 61 to the tongue 64 to further press the lips 63 against the pipe surface 74 and to press the tongue bottom face 66 against the pipe. The tongue's bottom face and the lips' bottom faces may be of a smooth texture to achieve a good seal. Any other surface texture or configuration, i.e. ribs, may be substituted. The resilient arms 51 are brought into contact with each other upon tightening of the housing around the gasket and serve to further increase the compression on the sealing portions of the gasket. This end is achieved by holding the gasket sides 62 in a more nearly upright position than would be otherwise possible.

It is to be understood that a single member could be provided to connect the base portions and to hold the side portions in an upright position because of their ease of production through an extrusion process, the resilient arms are described herein.

Further advantage obtainable by use of a gasket having a tongue and compensating well include reducing turbulence in the fluid which is flowing through the pipe, improving the resistance to leakage without decreasing the flexibility of the pipe joint and reducing the vulnerability of the seal to destruction caused by the collection of deposits in the well.

The present invention further improves upon gaskets having a tongue by substantially reducing the size of the cavity portions 65 when the seal is installed, by providing a compensating well 50, by providing compression pads 52, by incorporating resilient arms 51, by providing a second well 53 and by utilizing a unique cooperation of these elements to obtain a versatile, flexible and longlasting seal which is not subject to the drawbacks of the prior art. The present invention is more resistant to failure caused by burnoff or flashback (burning of the fluid while inside the pipe or gasseous flow of burning or burned vapors through the pipe) than any prior gasket due to the multiple sealing surfaces and the novel gasket loading accomplished by use of the above described compression forces.

In the ordinary manner of manufacturing the gasket of this invention, a strip of gasket material having the desired cross section is extruded through a conventional extrusion process, is cut to the proper length for surrounding a pipe of the preselected size and is formed into a circular shape whereupon the ends of the strip are cemented together by conventional methods. The gasket is then ready for installation. An improved and novel feature is made possible through the use of the gasket profile of the present invention. A strip of the extrudate may be cut to size on location, that is, at the location of the pipe joint which is in need of a replacement gasket, and may be rapidly installed without the need for shutting down a large operating plant for any applicable period of time. This provides significant savings of downtime and associated expenses and losses. In order to obtain this benefit, cementing of the ends of the gasket forming strip takes place while the gasket is situated at the pipe joint. A band is placed within the compensating well and is tightly secured around the gasket to firmly hold the gasket in place to the ultimate end that the gasket end are in firm abutment. By the timely application of a fast acting cement such as epoxy to the gasket ends, the gasket may be fabricated on site.

Reassembly of the housing may be commenced immediately to further reduce the downtime required for gasket replacement. It is not required that the band be removed from the gasket since its presence will not interfere with the operation of the gasket. The housing of conventional type, is bolted around the gasket and will tend to firmly hold the gasket ends together until the cement is fully cured and the gasket ends are fully secured. In this manner, gasket replacement may be accomplished without any need to dislocate the pipes. The old gasket may be cut off and the new gasket fabricated on site providing a great benefit over previous gasket replacement methods.

In this manner, use of the effected pipe may commence within a very short time following opening of the system for gasket replacement. There is no need to maintain a supply of gaskets for each and every pipe size since a supply of the gasket strip material may be easily cut to the appropriate length and readily installed. Extensive downtime for ordering any particular gasket size and awaiting arrival of the gasket is avoided.

This gasket provides additional protection from environmental hazards posed by leaky gaskets. The multistage sealing mechanism of the present invention provides a safety level which was not possible with prior gaskets. The seal obtained by the tongues contact with the pipe ends renders the gasket less subject to flashback damage than prior gaskets; the tongue to pipe end seal prevents particulate matter from collecting in the cavity portions and interfering with the flexibility of the gasket; the lips are sealed against the pipe by the compressive loading of the gasket which is enhanced by the compression pads of the present invention, and; the lips are further sealed against the pipe by the pressure exerted on the upper surface of the lips by any fluid which is admitted into the cavity portions.

In FIG. 2 it will be seen that the purpose of gasket 69 is to provide a tongue materially wider than the maximum gap between the pipe ends. This provides for a substantial seating of the tongue on the exterior of both sections of the pipe commencing at and extending from a substantial distance inwardly from the free ends of the pipe sections.

In FIG. 2 a small portion of the tongue 64 protrudes down between the ends 73. This protrusion is merely sufficient to serve as a buffer against the pipe ends tending to come towards each other. At the same time when the pipe gap is at its full open position, it is a sufficient inward projection to reduce turbulence resulting from cavitation between the pipe ends.

The important additional function performed by the gasket is a substantial sealing effected where the annular portions of substantial width of the surface 66 engage the outer surfaces 74 of the pipes just inwardly from the ends 73 thereof. This provides tight sealing areas in advance of the seals effected by the lips 63.

Figure 3:
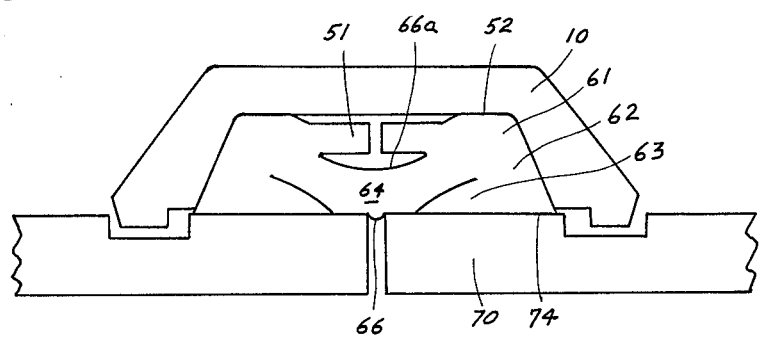
FIG. 3 is a fragmentary section through a pipe joint in accordance with the invention showing, respectively, the gasket of FIG. 1 in place within the coupling housing with the pipe gap full closed.

FIG. 3 shows the gasket when the pipe gap is narrowed. In this state, the tongue is forced upwards further compressing the tongue against the exterior of the pipe. The high integrity of the seal is not lost when the gap is narrowed. It may be expected that the additional compression of the tongue will result in a tighter seal and exposure of a smaller portion of the tongue to the flowing medium. This results in improved gasket life since exposure to the medium will be reduced when the gap is smaller, a condition frequently associated with higher temperatures.

Figure 4:
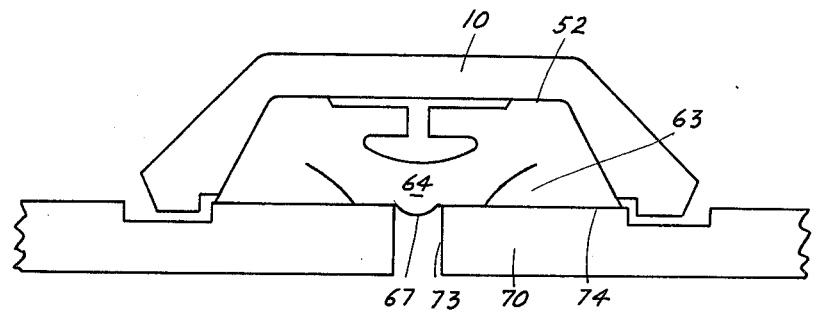
FIG. 4 is a similar view of a gasket of the same type as that of FIG. 2 wherein a vacuum exists in the pipes.

FIG. 4 shows the improved performance of the gasket when a partial vacuum exists in the system. The reduced pressure on the exposed tongue surface causes greater pressure at the tongue-pipe interface. Such a feature, although not unique to a gasket having a compensation well, is more effective with a compression well due to the increased flexibility of the gasket, permitting the tongue to be flexed by the pressure differential.

Figure 5:
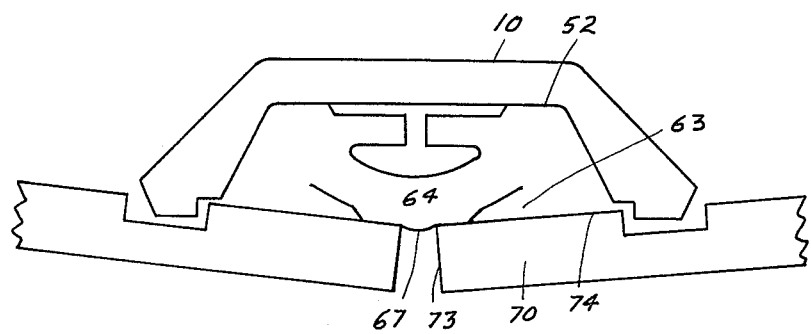
FIG. 5 is a fragmentary sectional view of related portions of gasket and coupling housing showing pipe-negative deflection.
Figure 6:
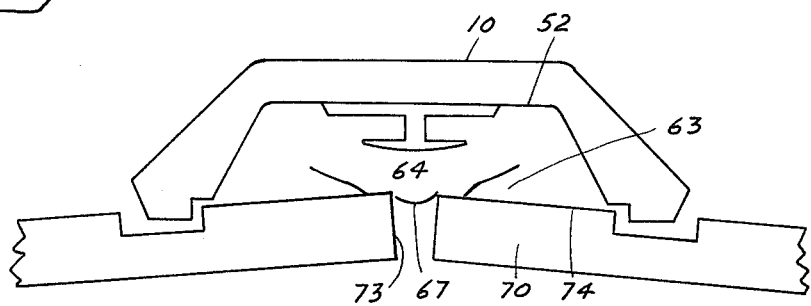
FIG. 6 is a fragmentary sectional view of related portions of gasket and coupling housing showing a pipe-positive deflection.

FIGS. 5 and 6 illustrate the flexing of the gasket during negative and positive pipe deflection, respectively. In FIG. 5, the tongue follows the receding pipe ends to prevent the entry of piped medium from entering the cavity portions while in FIG. 6, the tongue is further compressed to more tightly seal the pipe joint from leakage. The compensation well is partially occupied by the deflected portions of the tongue, providing an added flexibility to the gasket which would not be permitted by a solid gasket having no compensation well.

In each of FIGS. 2-6, the compression pads 52 have been forced downwards until level with the resilient arms 51 due to the compressive forces applied by the coupling housing. The added compression created by the downward displacement of the compression pads greatly improves the sealing effect of the lip portions 63 against the pipe exterior 74.

Though in the foregoing description and accompanying drawings a preferred embodiment of the invention has been shown and its use described, it is of course to be understood that this disclosure is illustrative and is not to be taken as a limitation in any manner. One skilled in the art would be readily able to devise many modifications of the preferred embodiment without departing from the spirit and scope of the invention.

It is therefore to be understood that the intention with regard to all matter contained herein is that it shall be treating as illustrative and not as limiting.

What is claimed is:

1. An extruded strip of resilient gasket material for forming of annular gaskets of the type designed for enclosure in a coupling housing in coupling of groove end pipe, said strip having a cross section which comprises:

two base portions, two side portions, each having an outside and an inside face, two compression pads, two resilient arms, each having a top, a bottom and an end face, said arms connected one to each of said respective base portions and extending therebetween, a tongue portion having a top and a bottom face, two lip portions, each having a top and a bottom face, said side portions extending downward each from a respective one of said base portions, each compression pad extending upward from a respective one of said base portions, said tongue portion extending between said base portions below said resilient arms, said tongue portion having a curved shape such that its middle portion is lower than its end portions, each lip portion extending inward from a respective one of said side portions, said top face of said tongue portion and said bottom faces of said resilient arms defining a compensation well, said bottom face of said tongue portion, said top face of each lip portion and the inside face of the respective said portion respectively defining two cavities, said lips' bottom faces having a smooth texture for efficient sealing against a pipes' external surface, said tongue's bottom face having a smooth texture for efficient sealing against a pipe's external surface, said tongue portion having a substantial degree of flexibility.

2. The strip claimed in claim 1 wherein:
   each of said resilient arms is angled such that the end faces are slightly higher than the connections to said base portions.

3. The strip claimed in claim 1 wherein:
   said side portions angle slightly outward as they extend downward.

4. The strip claimed in claim 1 wherein:
   said tongue portion is thinner at its center than at its end.

5. The strip claimed in claim 1 wherein:
   said tongue portion is thinner at its center than at its ends,
   said side portions angle slightly outward as they extend downward,
   said resilient arms angle slightly upward as they extend downward,
   said resilient arms angle slightly upward as they extend between said base portions.

6. An extruded strip of resilient gasket material for forming of annular gaskets of the type designed for enclosure in a coupling housing in coupling of groove end pipes, said strip having a cross section comprising:
   lip means for preventing fluid flow along the pipes' exterior;
   tongue means for preventing fluid flow from between the ends of said groove end pipe;
   means defining a compensating well for permitting reasonable freedom of movement of said pipes without damaging said gasket,
   compression pad means for providing compressive loading of said gasket upon securing of said coupling housing about said gasket,
   resilient arm means for maintaining a separation between said compression pad means.

7. A resilient annular gasket of the type designed for enclosure in a coupling housing in coupling of groove end pipe comprising:
   lip means for preventing fluid flow from between the ends of said pipe,
   tongue means for preventing fluid flow from between the ends of said pipe,
   a compensating well in said gasket to permit gasket flexing and to improve gasket life, said compensating well defined by side portion means, resilient arm means and a back surface of said tongue means.

* * * * *